(12) United States Patent
Bishop

(10) Patent No.: US 8,222,558 B2
(45) Date of Patent: Jul. 17, 2012

(54) SHIELD

(75) Inventor: Jeffrey C. Bishop, Willington (GB)

(73) Assignee: Rolls-Royce PLC, London (GB)

( * ) Notice: Subject to any disclaimer, the term of this patent is extended or adjusted under 35 U.S.C. 154(b) by 258 days.

(21) Appl. No.: 12/743,592

(22) PCT Filed: Oct. 28, 2008

(86) PCT No.: PCT/GB2008/003654
§ 371 (c)(1),
(2), (4) Date: Jun. 18, 2010

(87) PCT Pub. No.: WO2009/068843
PCT Pub. Date: Jun. 4, 2009

(65) Prior Publication Data
US 2010/0270270 A1    Oct. 28, 2010

(30) Foreign Application Priority Data
Nov. 29, 2007    (GB) .................................. 0723327.3

(51) Int. Cl.
*B23K 9/16*    (2006.01)
*B23K 9/167*    (2006.01)
(52) U.S. Cl. ........................................... 219/74; 219/75
(58) Field of Classification Search .................... 219/74, 219/75
See application file for complete search history.

(56) References Cited

U.S. PATENT DOCUMENTS

| 2,902,587 A * | 9/1959 | Bernard ........................... 219/74 |
| 3,125,666 A | 3/1964 | Gorman et al. |
| 3,875,364 A * | 4/1975 | Boyett ............................. 219/74 |
| 4,501,949 A * | 2/1985 | Antol et al. .............. 219/121.63 |
| 4,642,445 A | 2/1987 | Stol |
| 4,839,489 A | 6/1989 | Dyer |
| 5,393,949 A * | 2/1995 | Stricklen ......................... 219/74 |
| 2004/0118519 A1 * | 6/2004 | Sen et al. ................. 156/345.33 |

FOREIGN PATENT DOCUMENTS

DE    42 39 556 A1    7/1993

OTHER PUBLICATIONS

Search Report issued Feb. 13, 2009 in International Application No. PCT/GB2008/003654.
Written Opinion issued Feb. 13, 2009 in International application No. PCT/GB2008/003654.

* cited by examiner

*Primary Examiner* — Luan C Thai
(74) *Attorney, Agent, or Firm* — Oliff & Berridge, PLC

(57) ABSTRACT

Provisions of shields for protecting welds as well as providing heat treatments are advantageous. Previously such shields were bespoke constructions produced iteratively and empirically for particular applications and uses. By utilization of accurately cut sheets of material within which labyrinths are created it is possible to produce an output flow which is even and incorporates no vortexes. In such circumstances problems with regard to edge entrainment of oxygen causing possible oxidation problems in output flows as well as variations in heat treatments can be avoided. The shield also avoids use of welds which may become distorted during welding or heat treating processes. For reproducibility the shield is formed from accurately produced reproducibility components such that shields can be made at a number of sites to provide the same shield function.

16 Claims, 2 Drawing Sheets

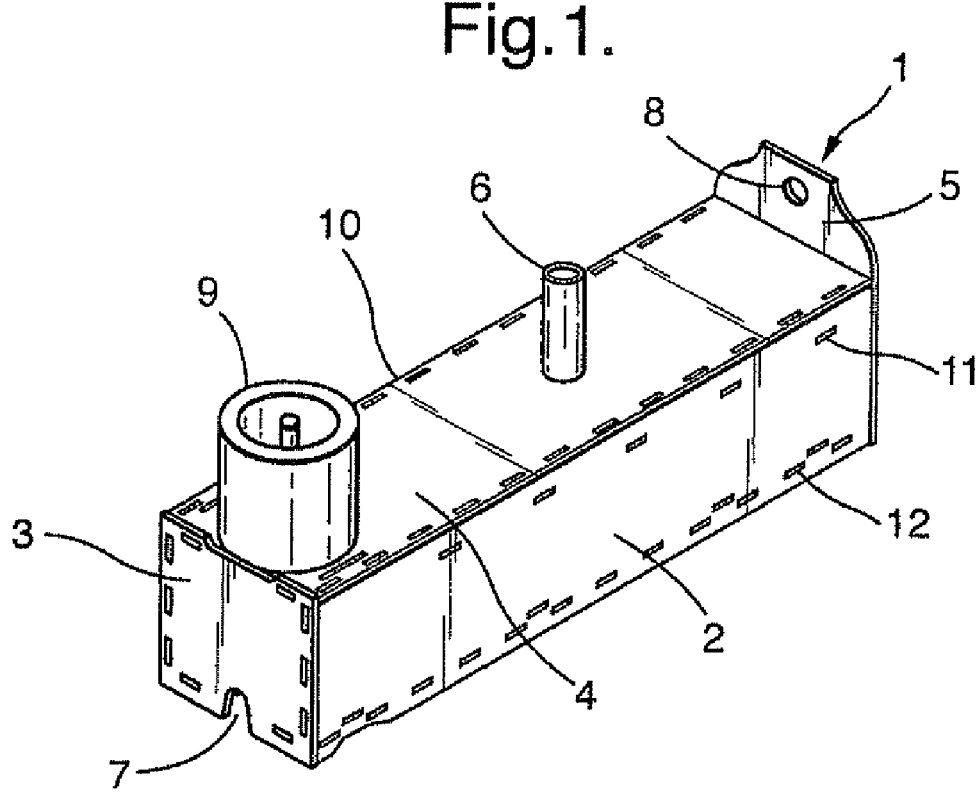
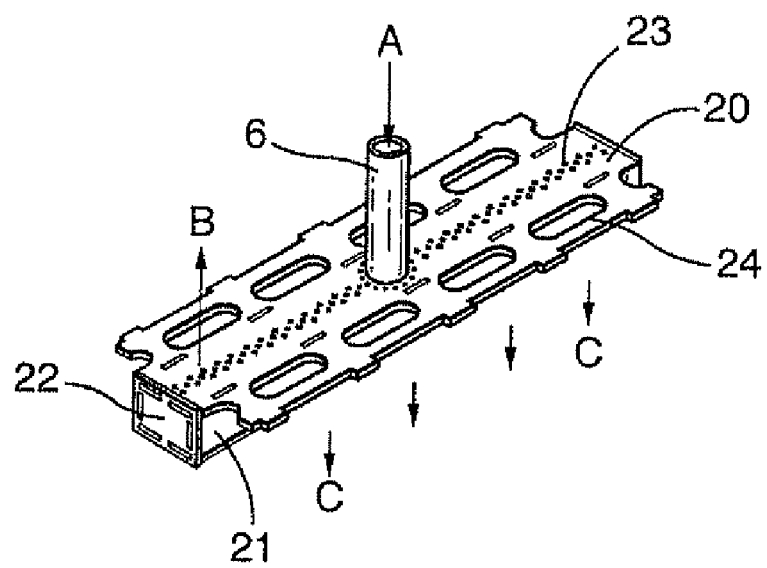

SHIELD

The present invention relates to shields and more particularly welding shields utilised with regard to providing an inert atmosphere about a weld in materials such as titanium and titanium alloys.

It is well known to provide inert atmospheres in the form of a fog or cloud about a weld in order to avoid oxidation. Particularly, an inert gas such as Argon is utilised in order to create an acceptable atmosphere about the weld. It will be understood that the inert atmosphere is necessary to avoid oxidation above particular temperatures for the metal or alloy welded. In such circumstances, in addition to the particular period when the weld is created it is also typically necessary to maintain an inert atmosphere until the weld material has cooled below a particular temperature. With regard to titanium and titanium alloys this is generally around about 400° C.

Initially sealed cabinets were utilised in order to provide the inert atmosphere but these have practical problems. More recently, localised inert shields for welding have generally been created. In any event, it will be understood that in addition to considerations with regard to creating an inert atmosphere further factors are involved such as achieving appropriate ergonomic performance and in particular maintaining dexterity with respect to welding techniques if performed manually.

Generally, the inert atmosphere created by the welding shield should be vortex free in order to provide a controlled atmosphere around and about where a weld is focused. A vortex free atmosphere denies edge of envelope entrainment of air and in particular oxygen which may draw such oxygen into the weld vicinity and so cause oxidation.

Typical prior inert shields for welding of titanium and its alloys have been bespoke. It will be understood that dependent upon the particular weld to be performed a weld practitioner may devise their own weld shield which can be adapted until a good weld is achieved. In such circumstances, provision of weld shields is both unpredictable and dependent upon the skills of the welder.

Prior weld shields have taken the appearance of a pepper pot with one or a number of tube connectors as inlets for an inert gas supply. The shield is filled with steel wire wool as a method of breaking down internal flow steams. Thus, there is a vortex free gas flow from the pepper pot surface which creates an inert atmosphere about the weld. In such circumstances, these prior weld shields can take a strange shape with their functional shape being very much dependent on the shape of the necessary shielded weld. Furthermore, as the weld shields themselves are usually fabricated and welded so that during the welding process there may be distortions which do not particularly enhance preservation of the pre-weld form. Thus, there may be an unpredictability and degradation in performance.

In view of the above it will be appreciated that reproducibility with regard to welding shields is difficult. Such problems with reproducibility can lead to disparities in performance between difference workshop sites at which the same welding function is to be formed. For example, with regard to a repair as indicated a particular welder or welding shop may have experience in order to achieve higher levels of competence but it will be unacceptable to require all repairs to be transferred to that particular welder or weld shop. In such circumstances there is desirability with regard to producing weld shields for use at different locations and also to avoid problems with distortions such that replacement weld shields can be created quickly.

In accordance with the present invention there is provided a shield for providing an inert gas cloud about a weld site or for heat treatment, the shield comprising a box having an inlet for a gas and a flow dispersal element for reduction in gas vortex in the flow through an outlet, the shield characterised in that the box is provided by panels having respective apertures and tongues for assembly, each tongue engaging an aperture to retain position in the assembly of the shield, a labyrinth panel extending across internally within the box having labyrinth apertures, the inlet extending to a lateral channel defined by some of the panels to provide a lateral path to first labyrinth apertures in the labyrinth panel for determining a first labyrinth path in substantially a direction opposite to the inlet, the box defining a distribution plenum chamber above the first labyrinth apertures with second labyrinth apertures in the labyrinth panel to define a second labyrinth path which is substantially in a direction opposite to the first labyrinth path, a base of the box having an outlet plenum chamber associated with the second labyrinth path and the box having a base panel defining the outlet in the form of apertures in a mesh.

Typically, the panels are formed from a metal sheet cut to define the tongues and grooves along with dependent upon the panel, labyrinth apertures and mesh apertures. Generally, the panels are defined by laser cutting.

Possibly, the panels are formed from steel or aluminium.

Generally, seams are defined by the panels at tongue and groove engagements.

Normally, the seams are sealed.

Generally, at least a top panel and the base panel present a welding support. Typically, the welding support is a welding nozzle. Generally, the box defines an electrical earthing point.

Normally, the shield has a plurality of labyrinth panels to define cascades of labyrinth paths through the shield from the inlet to the outlet.

Possibly, the distribution plenum chamber and the outlet plenum chamber are filled with a flow matrix. Possibly, the flow matrix is a wire wool.

Typically, the box is rectangular. Alternatively, the box is curved or otherwise shaped dependent upon an expected displacement path.

Generally, the welding shield will incorporate a clamping mechanism to associate the shield with a surface.

Typically, the mesh is supported by a low obstruction grid.

An embodiment of aspects to the present invention will now be described by way of example with reference to the accompanying drawings in which:

FIG. 1 is a perspective view of a welding shield in accordance with aspects of the present invention;

FIG. 3 is a perspective view of a labyrinth panel and lateral channel in accordance with aspects of the present invention.

Figure 2:
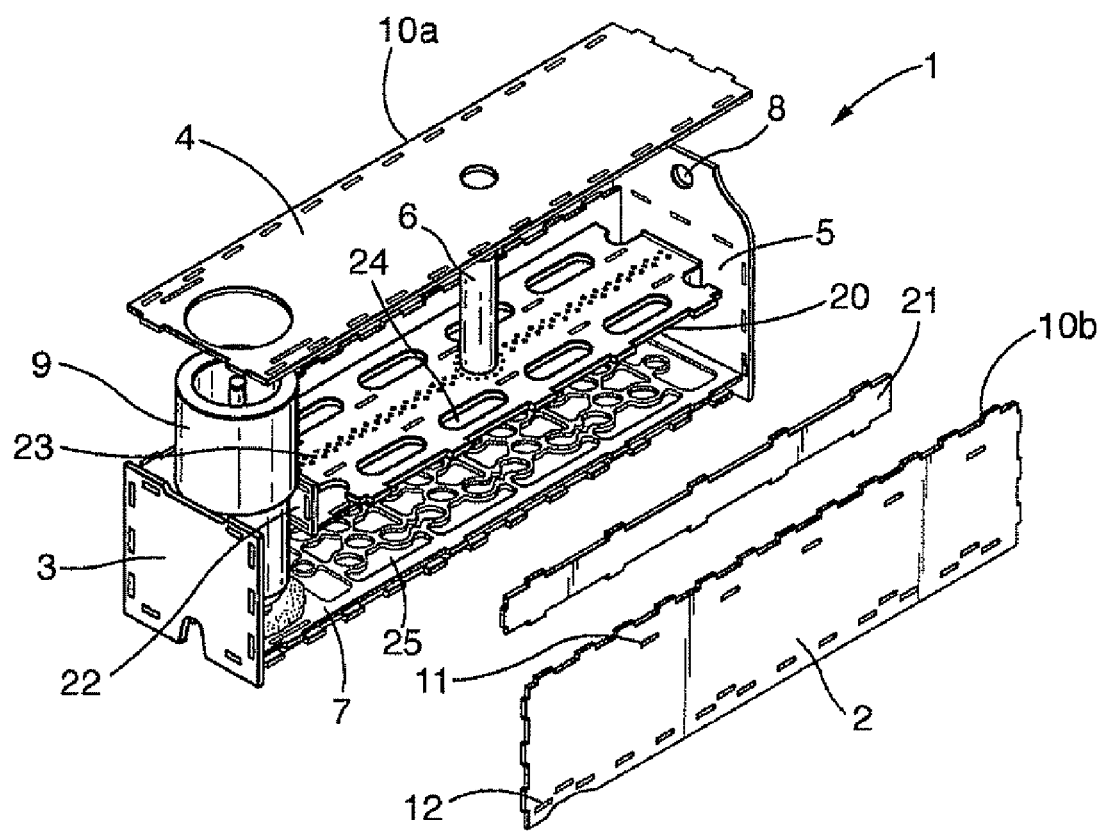
FIG. 2 is an exploded view of the welding shield depicted in FIG. 1.

As indicated above in order to protect a welding site both during the welding process and post such welding processes whilst the weld area is at a temperature above that acceptable to avoid oxidation it is known to provide an inert atmosphere. Typically this inert atmosphere will comprise an Argon gas presented as a vortex free fog. Although provision of a seal cabinet will have benefits it will also be appreciated that such sealed cabinets will greatly inhibit the dexterity of a manual welder whilst provision of robotic welding apparatus may create further problems such as with respect to access and mounting. A vortex free atmospheric fog about the weld site is advantageous in order to avoid entrainment of oxygen and therefore oxidation which may compromise the robustness of the welding process. In the above circumstance it has been known previously to provide effectively bespoke apparatus to form weld shields. Such prior welding shields have been produced generally by iterative and empirical methods rather than through deliberate design and construction.

Aspects of the present invention provide a weld shield which can be more readily reproduced and which avoids potential problems as a result of incorporating welded seams or otherwise which may distort in use. Reproducibility is a requirement and in particular producing the same weld shield design at two or more different sites is an advantage. The weld shield may be simple and cheap to produce allowing disposal after one use avoiding distortion problems.

Aspects of the present invention provide a weld shield having a structure which is substantially distortion free which enables construction from relatively cheap and simple mechanisms. The shield has an objective of achieving a uniform vortex free gas flow in order to bath and protect the weld working area. This is achieved through providing a route for the gas such as Argon passing through the shield which disperses and avoids vortex creation so ensuring a desirable inert gas fog about a weld site.

It will be appreciated that ideally a single inlet for gas supply will be provided for simplicity but such single inlets can create flow distortion problems for a weld shield particularly when a weld area is extensive. Aspects of the present invention provide for gas distribution through the weld shield by creating structures of substantially identical design and therefore inert gas delivery performance.

It will be appreciated the approach of passing a fluid medium such as an inert gas through a series of orifices in order to condition the flow is not new. Such conditioning seems to create order from chaos. In such circumstances by providing a weld shield with a succession of labyrinth orifice plates and organised changes to the general direction of flow to condition and remove the spikes in the flow velocity an appropriate welding shield can be provided. The weld shield will provide a weld protecting inert gas which has a velocity anywhere within an exit area which meets equations such as:

$$V_{EX} = (V_{IN} \cdot A_{IN})/A_{EX} \text{ or}$$
$$A_{EX} = V_{IN} \cdot A_{IN} = \text{Constant} = V_{IN} \cdot A_{IN}$$

Where $V_{EX}$=velocity of flow at exit, $V_{IN}$=velocity at inlet, $A_{IN}$=cross sectional area of flow at inlet and $A_{EX}$=cross sectional area of flow at exit.

The above relationship is simplistic and meant to demonstrate that increasing or decreasing of inlet flow relates directly to the outlet flow. It will be appreciated that the flow rate through the outlet is not controlled by the weld shield but only its condition as a uniform vortex free cloud to protect the weld site. If exit area is increased it will be understood that the gas inlet flow rate has also to increase to an appropriate level to maintain flow density through the exit area of the weld shield.

FIG. 1 provides a schematic perspective view of a weld shield 1 in accordance with aspects of the present invention. This shield 1 comprises a number of panels 2, 3, 4, 5 secured together in order to create a box enclosure in which an inert gas is provided through an inlet 6. As will be described later inert gas is appropriately distributed to avoid vortexes as presented through a base surface 7 in order to provide a weld shield. The weld shield 1 incorporates an electrical earthing point 8 and a coupling 9 for association with a welding nozzle. Thus, the weld shield 1 can be moved in order to provide protection about a weld site in use by presentation of inert gas through a base surface 7.

The weld shield 1 is constructed through a tongue and slot formation along edges 10 between panels 2, 3, 4, 5. Tongue and slots effectively create seams formed by slot rivets along the edges 10 which are less acceptable to distortion and therefore retain operability with regard to the weld shield in use. However, such slot rivets/tongue and slot association between the panels 2, 3, 4, 5 allows cheap and robust construction of the weld shield 1 as well as repeatability.

As will be described later the base 7 is effectively constructed of an appropriately sized mesh supported upon a grid. The mesh will typically be a stainless steel for robustness of presentation. The mesh will have holes or apertures to act as outlets.

The panels 2, 3, 4, 5 are cut typically through a laser cutting process from an appropriate sheet of material. The tongue or rivet element along the edges of the panels 2, 3, 4, 5 engage slots in an opposed panel 2, 3, 4, 5 to create a non-welded box construction for the weld shield 1 which has specific repeatability to enable replica units to be created. It will be noted that within the panel 2 further rows of slots 11, 12 are provided which will present internal labyrinth panels to create labyrinth paths through the shield 1 in order to remove any vortex distortion in the inert gas flow presented at the base surface 7.

FIG. 2 illustrates an exploded view of the weld shield 1 depicted in FIG. 1. Thus, as can be seen the panels 2, 3, 4, 5 are associated together through tongues or rivets entering slots in opposed panels in order to create the seams. Internally within the shield 1 a labyrinth plate 20 is provided along with further panels 21, 22 in order create a lateral channel. In such circumstances an inert gas presented through the inlet 6 will pass laterally along the channel created by the panels 21, 22 such that this flow will pass upwards through first labyrinth apertures 23 into a labyrinth space or plenum chamber between the labyrinth plate 20 and a bottom surface of the panel 4. In such circumstances inert gas will then again turn through a further 180° to flow in the opposite direction through second labyrinth apertures 24 into an outlet space or plenum chamber formed between a base panel 7 and the labyrinth panel 20. In such circumstance the inert gas will be evenly distributed along the base 7 of the weld shield 1.

As can be seen the base panel 7 incorporates a grid 25 which supports an aperture mesh to facilitate vortex free distribution of the inert gas initially presented through the inlet 6.

Each of the panels 2, 3, 4, 5, 20 as indicated is cut from an appropriate sheet of material with accurate creation of tongues or rivets along with apertures for construction of the weld shield along with sizing with respect to the apertures 23, 24 and formation of the lateral channel through panels 21, 22.

FIG. 3 provides a perspective view of the labyrinth panel 20 along with inlet 6 and the panels 21, 22 utilised to create the lateral channel for inert gas distribution in the weld shield 1 depicted in FIGS. 1 and 2. Thus, as can be seen the inlet 6 presents an inert gas flow A to an internal lateral channel created by panels 21, 22. The inert gas flow A is laterally dispersed and turned through 180° to exit into labyrinth plenum chamber as described above defined by the labyrinth panel 20 and other parts of the weld shield 1. The inert gas flow A passes upwards in an opposite direction to that of flow A in the direction of arrowheads B through first labyrinth apertures 23. This labyrinth chamber acts as a plenum for the all inert gas flowing in the direction of arrowhead B.

Within the labyrinth panel 20 there are also second labyrinth apertures 24 which are provided such that inert gas exits from the labyrinth chamber through these apertures 24. In such circumstances the inert gases again turns through a further 180° such that the flow C is in the opposite direction to arrowheads B in order to allow distribution through the mesh in the base panel 7 as described above.

It will be appreciated that the inlet 6 as a tube is positioned to be clear of a channel bottom panel forming the lateral channel within the shield 1. In such circumstances the inert gas presented in the direction of arrowheads A will be able to flow in a 360° radial direction out of the inlet 6 into the lateral channel created by the panels 21, 22 and the bottom panel (not shown) in the shield 1. By utilising accurately profiled and shaped flat panels with integrated non-intrusive and non-welded joints created by the tongues/rivets and slots a weld shield construction is provided in which a complex labyrinth can be made of almost any size or shape utilising flat sheet materials and requiring no special tooling. Furthermore, weld shields in accordance with aspects of the present invention due to their relatively simple and easy construction can accommodate in addition to rectangular shapes as depicted above curved and specific shapes for particular weld situations. Thus, the weld shield can be curved or otherwise shaped for accommodation about a part requiring welding.

In addition to provision of means for presenting a weld apparatus it will also be understood that weld shields in accordance with aspects of the present invention will include means for clamping the weld shield to a component.

FIGS. 1 to 3 illustrate for clarity purposes a single tiered labyrinth in accordance with aspects of the present invention. Generally in order to provide a practical weld shield in accordance with aspects of the present invention there will be at least three distribution and conditioning labyrinth panels in the forms of tiers cascaded through the weld shield for elimination of any vortex distortion in the inert gas flow. Generally labyrinths are more numerous and tortuous and as depicted above with regard to FIGS. 2 and 3 provide a uniform exit flow density. Thus, it is possible to increase flow rate for an increased area even when a single inlet is used and the weld shield has a non uniform shape.

Weld shields in accordance with aspects of the present invention as indicated provide certain advantages over prior bespoke weld shields. Due to their nature of simple construction utilising rivet or tongues entering slots to form box structures, weld shields in accordance with the aspects of the present invention provide reproducibility to a high standard with regard to provision of an inert gas cloud about a weld. Weld shields can be formed from kits supplied centrally or in accordance with drawings showing the requirements for a weld shield to perform a particular function with regard to a welding operation.

As indicated the panels and other structures with regard to weld shields in accordance with aspects of the present invention are formed from sheet materials and the slots and other positions for the labyrinth panels can be adjusted as required to create an acceptable weld shield for performance. In such circumstances once an appropriate weld shield is constructed for requirements, the positioning and construction of that weld shield can be repeated with a high level of consistency. Furthermore, production of flat panels with labyrinth apertures allow the same construction of the weld shield to be achieved repeatedly in different workshops.

As indicated above aspects of the present invention relate to creating a vortex free gas cloud about a portion of a component for welding. It will also be understood that the weld shield in accordance with aspects of the present invention may be utilised for creating post weld repair heat treatments for damaged components. In such circumstances the shield as described above will present high temperature inert gas as such as Argon through an orifice plate such that the high temperature gas is directed towards a portion of the component. The high temperature gas will provide heat treatment of the exposed portions of the components. In such circumstances it will be appreciated that shields have to be tailored to suit the size of the component such as a turbine blade and the repair site upon the component within tight boundaries for each treatment. As with a shield used for welding a number of labyrinth cascades are provided to eliminate vortexes within the presented flow. The high temperature inert gas cascades through the labyrinths as described above comprising labyrinth panels with respective first and second labyrinth apertures before presentation through a mesh supported upon a grid. The exiting high temperature inert gas thus has no vortexes and therefore a uniform heat treatment is achieved.

Modifications and alterations to aspects of the present invention will be understood by those skilled in the art. Thus, for example as indicated shields may be created with varying numbers of labyrinth panels with dimensions and configurations to achieve best performance in use. The size of the mesh provided in the base surface in terms of distribution of apertures may be altered dependent upon requirements and shaping of that surface as presented to an area to protect a weld or provide a heat treatment. In order to maintain a temperature for the inert gas, particularly with regard to heat treatment embodiments, means may be provided to maintain inert gas temperature through heating of the shield in accordance with aspects of the present invention.

The invention claimed is:

1. A shield for providing an inert gas cloud about a weld site or for heat treatment, the shield comprising a box having an inlet for a gas and a flow dispersal element for reduction in gas vortex in the flow through an outlet, the shield wherein the box is provided by panels having respective apertures and tongues for assembly, each tongue engaging an aperture to retain position in the assembly of the shield, a labyrinth panel extending across internally within the box having labyrinth apertures, the inlet extending to a lateral channel defined by some of the panels to provide a lateral path to first labyrinth apertures in the labyrinth panel for determining a first labyrinth path in substantially a direction opposite to the inlet, the box defining a distribution plenum chamber above the first labyrinth apertures with second labyrinth apertures in the labyrinth panel to define a second labyrinth path which is substantially in a direction opposite to the first labyrinth path, a base of the box having an outlet plenum chamber associated with the second labyrinth path and the box having a base panel defining the outlet in the form of apertures in a mesh.

2. A shield as claimed in claim 1 wherein the panels are formed from a metal sheet cut to define the tongues and grooves along with dependent upon the panel, labyrinth apertures and mesh apertures.

3. A shield as claimed in claim 2 wherein the panels are defined by laser cutting.

4. A shield as claimed in claim 1 wherein the panels are formed from steel or aluminum.

5. A shield as claimed in claim 1 wherein seams are defined by the panels at tongue and groove engagements.

6. A shield as claimed in claim 5 wherein the seams are sealed.

7. A shield as claimed in claim 1 wherein at least a top panel and the base panel present a welding support.

8. A shield as claimed in claim 7 wherein the welding support is a welding nozzle.

9. A shield as claimed in claim 1 wherein the box defines an electrical earthing point.

10. A shield as claimed in claim 1 wherein the shield has a plurality of labyrinth panels to define cascades of labyrinth paths through the shield from the inlet to the outlet.

11. A shield as claimed in claim 1 wherein the distribution plenum chamber and the outlet plenum chamber are filled with a flow matrix.

12. A shield as claimed in claim 11 wherein the flow matrix is a wire wool.

13. A shield as claimed in claim 1 wherein the box is rectangular.

14. A shield as claimed in claim 1 wherein the box is curved or otherwise shaped dependent upon an expected displacement path.

15. A shield as claimed in claim 1 wherein the welding shield will incorporate a clamping mechanism to associate the shield with a surface.

16. A shield as claimed in claim 1 wherein the mesh is supported by a low obstruction grid.

* * * * *